United States Patent
Nadir et al.

(10) Patent No.: US 12,367,550 B2
(45) Date of Patent: Jul. 22, 2025

(54) SYSTEM AND METHOD FOR ADAPTIVE DISCRETE COSINE TRANSFORM (DCT) NOISE FILTERING FOR DIGITAL IMAGES

(71) Applicant: Samsung Electronics Co., Ltd., Suwon-si (KR)

(72) Inventors: Zeeshan Nadir, Allen, TX (US); Hamid R. Sheikh, Allen, TX (US); John W. Glotzbach, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 17/930,335

(22) Filed: Sep. 7, 2022

(65) Prior Publication Data
US 2023/0351563 A1    Nov. 2, 2023

Related U.S. Application Data

(60) Provisional application No. 63/336,725, filed on Apr. 29, 2022.

(51) Int. Cl.
| | |
|---|---|
| *G06T 5/10* | (2006.01) |
| *G06T 5/70* | (2024.01) |
| *G06T 7/11* | (2017.01) |
| *G06T 7/13* | (2017.01) |
| *G06V 10/56* | (2022.01) |

(Continued)

(52) U.S. Cl.
CPC ............... *G06T 5/10* (2013.01); *G06T 5/70* (2024.01); *G06T 7/11* (2017.01); *G06T 7/13* (2017.01);

(Continued)

(58) Field of Classification Search
CPC ..... G06T 5/10; G06T 5/70; G06T 7/11; G06T 7/13; G06T 2207/10024;

(Continued)

(56) References Cited

U.S. PATENT DOCUMENTS

| | | |
|---|---|---|
| 8,559,726 B2 | 10/2013 | Tang et al. |
| 2005/0025381 A1 | 2/2005 | Oizumi et al. |

(Continued)

FOREIGN PATENT DOCUMENTS

| | | | |
|---|---|---|---|
| CN | 111526366 B | 8/2021 | |
| WO | WO-2021249684 A1 * | 12/2021 | ........... H04N 19/117 |

OTHER PUBLICATIONS

Su et al, Joint Contrast Enhancement and Noise Reduction of Low Light Images via JND Transform, 2020, IEEE Transactions on Multimedia, 24: 17-32. (Year: 2020).*

(Continued)

*Primary Examiner* — Kathleen M Broughton

(57) ABSTRACT

A method includes dividing an image into overlapping image patches each having a specified size. The method also includes analyzing content of each image patch using a mathematical transform technique to classify each image patch into at least one class. The method further includes filtering each image patch for noise suppression by suppressing one or more transform coefficients of the image patch. An amount of suppression for each of the one or more transform coefficients is selected according to the at least one class of the image patch. In addition, the method includes reconstructing the filtered image patches into an output image.

21 Claims, 13 Drawing Sheets

(51) Int. Cl.
  *G06V 10/60* (2022.01)
  *G06V 10/764* (2022.01)
(52) U.S. Cl.
  CPC .............. *G06V 10/56* (2022.01); *G06V 10/60* (2022.01); *G06V 10/764* (2022.01); *G06T 2207/10024* (2013.01); *G06T 2207/20052* (2013.01)
(58) Field of Classification Search
  CPC . G06T 2207/20052; G06T 2207/20012; G06T 2207/20021; G06T 2207/20081; G06V 10/56; G06V 10/60; G06V 10/764; G06V 10/30; G06V 10/431; G06V 10/50
  See application file for complete search history.

(56) References Cited

U.S. PATENT DOCUMENTS

| | | | | |
|---|---|---|---|---|
| 2010/0080459 | A1* | 4/2010 | Dai | G06T 5/40 382/170 |
| 2016/0253787 | A1* | 9/2016 | Chen | G06T 5/70 382/275 |
| 2017/0132763 | A1 | 5/2017 | Salvador Marcos et al. | |
| 2018/0007260 | A1* | 1/2018 | Fukui | H04N 23/632 |
| 2023/0116285 | A1* | 4/2023 | Cui | H04N 19/186 375/240.08 |
| 2023/0252604 | A1* | 8/2023 | Nadir | G06T 5/10 382/254 |

OTHER PUBLICATIONS

Kumar et al, Novel Unsupervised Learning Architecture for Exposure-Based Classification and Enhancement, 2022, IEEE Transactions on Artificial Intelligence, 4(5): 1064-1075. (Year: 2022).*

Su et al, Perceptual Enhancement of Low Light Images Based on Two-Step Noise Suppression, 2018, IEEE Access, vol. 6, pp. 7005-7018. (Year: 2018).*

Gragnaniello et al, SAR Image Despeckling by Soft Classification, 2016, IEEE J. Selected Topics in Applied Earth Observations and Remote Sensing, vol. 9, No. 6, pp. 2118-2130. (Year: 2016).*

* cited by examiner

*Algorithm Details:*

$D \leftarrow$ *DCT Spectrum*

Threshold $\leftarrow$ *pre-selected threshold*

$X \leftarrow$ *Set of edge indices in dct spectrum*

$Y \leftarrow$ *Indices in top left quarter of dct spectrum*

$b \leftarrow \Sigma_{i \in Y} |D(i)|$ $T \leftarrow \{\}$ $E \leftarrow$ *Set of indices of dominant edges* for $x \in X$ $a \leftarrow \Sigma_{i \in x} |D(i)|$ $T \leftarrow T \cup (a/b, x)$ end for For $(t_1, t_2)$ in $T$ if $t_1 >$ *threshold*

$E \leftarrow E \cup \{t_2\}$

*end if*

*End for*

*Return E*

FIG. 12

SYSTEM AND METHOD FOR ADAPTIVE DISCRETE COSINE TRANSFORM (DCT) NOISE FILTERING FOR DIGITAL IMAGES

CROSS-REFERENCE TO RELATED APPLICATION AND PRIORITY CLAIM

This application claims priority under 35 U.S.C. § 119(e) to U.S. Provisional Patent Application No. 63/336,725 filed on Apr. 29, 2022, which is hereby incorporated by reference in its entirety.

TECHNICAL FIELD

This disclosure relates generally to imaging systems. More specifically, this disclosure relates to a system and method for adaptive discrete cosine transform (DCT) noise filtering for digital images.

BACKGROUND

As consumer devices with imaging capabilities proliferate, the use of these devices for capturing images has grown rapidly. End users are capturing images in a wide variety of environments, including those with low lighting. Low light imaging can be challenging because of noisy sensor data. In addition, the amount of noise in an image can be non-homogeneous. For example, noise in dark areas can be significantly higher than noise in bright areas. The dark area noise tends to limit how much the image can be brightened overall. In high dynamic range (HDR) images, there are both bright area noise (primarily including shot/photon noise) and dark area noise (primarily including read noise/sensor noise). The shot noise limits contrast in bright areas, while the read noise limits contrast in dark areas.

SUMMARY

This disclosure provides a system and method for adaptive discrete cosine transform (DCT) noise filtering for digital images. Note that other similar mathematical transform techniques can be used in place of DCT, such as a discrete Fourier transform (DFT) or a fast Fourier transform (FFT).

In a first embodiment, a method includes dividing an image into overlapping image patches each having a specified size. The method also includes analyzing content of each image patch using a mathematical transform technique to classify each image patch into at least one class. The method further includes filtering each image patch for noise suppression by suppressing one or more transform coefficients of the image patch. An amount of suppression for each of the one or more transform coefficients is selected according to the at least one class of the image patch. In addition, the method includes reconstructing the filtered image patches into an output image.

In a second embodiment, an electronic device includes at least one processing device configured to divide an image into overlapping image patches each having a specified size. The at least one processing device is also configured to analyze content of each image patch using a mathematical transform technique to classify each image patch into at least one class. The at least one processing device is further configured to filter each image patch for noise suppression by suppressing one or more transform coefficients of the image patch. An amount of suppression for each of the one or more transform coefficients is selected according to the at least one class of the image patch. In addition, the at least one processing device is configured to reconstruct the filtered image patches into an output image.

In a third embodiment, a non-transitory machine-readable medium contains instructions that when executed cause at least one processor of an electronic device to divide an image into overlapping image patches each having a specified size. The medium also contains instructions that when executed cause the at least one processor to analyze content of each image patch using a mathematical transform technique to classify each image patch into at least one class. The medium further contains instructions that when executed cause the at least one processor to filter each image patch for noise suppression by suppressing one or more transform coefficients of the image patch. An amount of suppression for each of the one or more transform coefficients is selected according to the at least one class of the image patch. In addition, the medium contains instructions that when executed cause the at least one processor to reconstruct the filtered image patches into an output image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 12 illustrates an example algorithm that can be performed in the process of FIG. 11 according to this disclosure.

DETAILED DESCRIPTION

FIGS. 1 through 13, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, low light imaging can be challenging because of noisy sensor data. In addition, the amount of noise in an image can be non-homogeneous. For example, noise in dark areas can be significantly higher than noise in bright areas. The dark area noise tends to limit how much the image can be brightened overall. In high dynamic range (HDR) images, there are both bright area noise (primarily including shot/photon noise) and dark area noise (primarily including read noise/sensor noise). The shot noise limits contrast in bright areas, while the read noise limits contrast in dark areas. Device manufacturers often use noise filters to control the presence of noise in captured images. Designing one noise filter for different light conditions and sensors is challenging because the noise profile changes with light conditions, thus making it difficult to use a single noise filter to filter an entire image. Conventional filters that control dark area noise typically remove too much detail in bright areas, while filters that attempt to retain details in bright areas typically ignore too much dark area noise.

This disclosure provides systems and methods for adaptive discrete cosine transform (DCT) noise filtering for digital images. As described in more detail below, the disclosed systems and methods feature an adaptive filter that can manage dark area noise and bright area noise separately. As a result, for an image that has both bright and dark areas, the disclosed adaptive filter denoises the dark areas separately from bright areas while retaining textured areas and produces superior image quality. The disclosed embodiments can adapt to bright and dark regions of an image, such as based on luminance values. The disclosed embodiments can also adapt to edge content in an image, thereby relaxing the denoising in areas where there is strong edge content for better contrast. Note that while various embodiments discussed below are described in the context of use in consumer electronic devices (such as smart phones), this is merely one example, and it will be understood that the principles of this disclosure may be implemented in any number of other suitable contexts.

Figure 1:
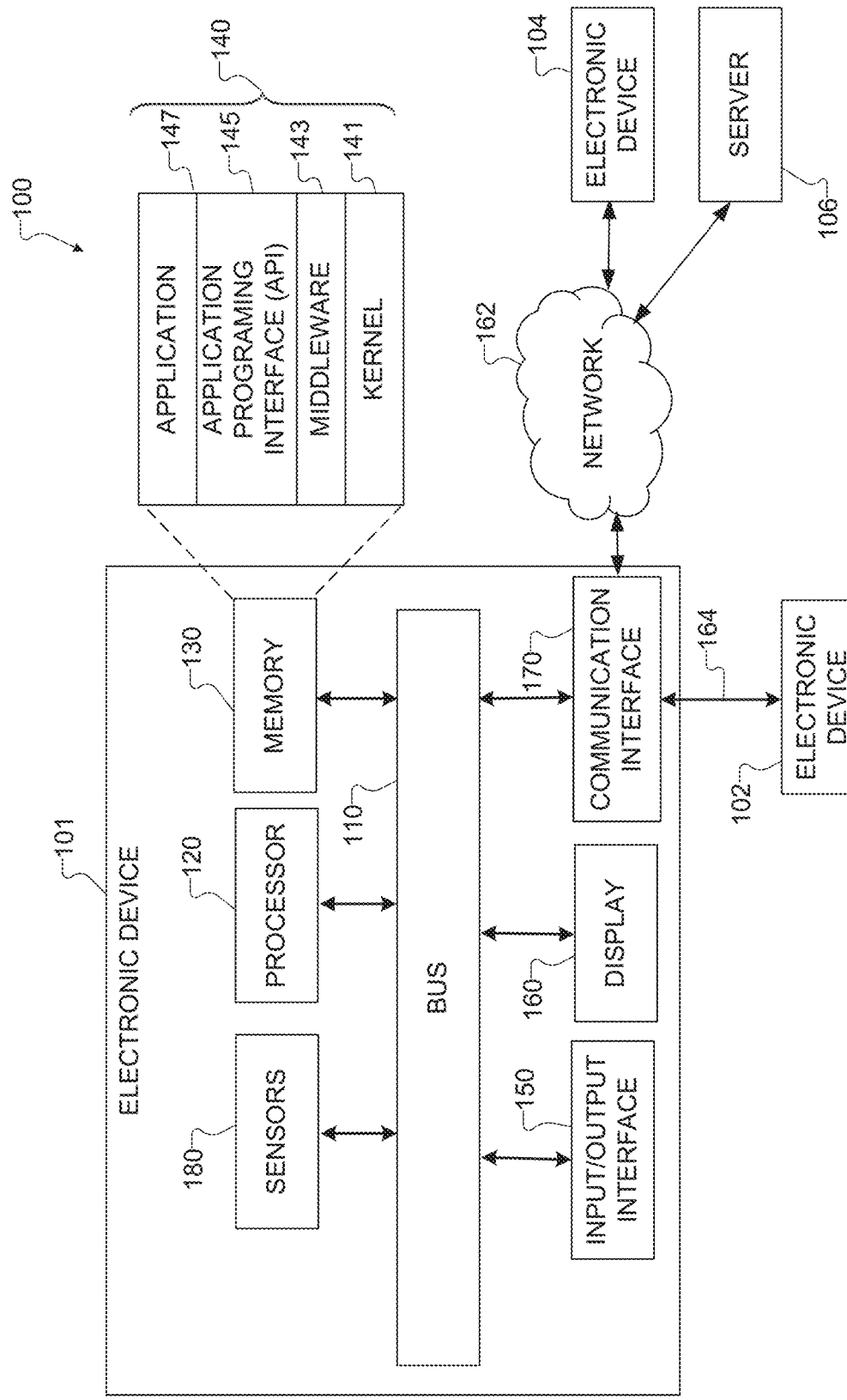
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 may perform one or more operations for adaptive DCT noise filtering for digital images.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for adaptive DCT noise filtering for digital images as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for adaptive DCT noise filtering for digital images.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
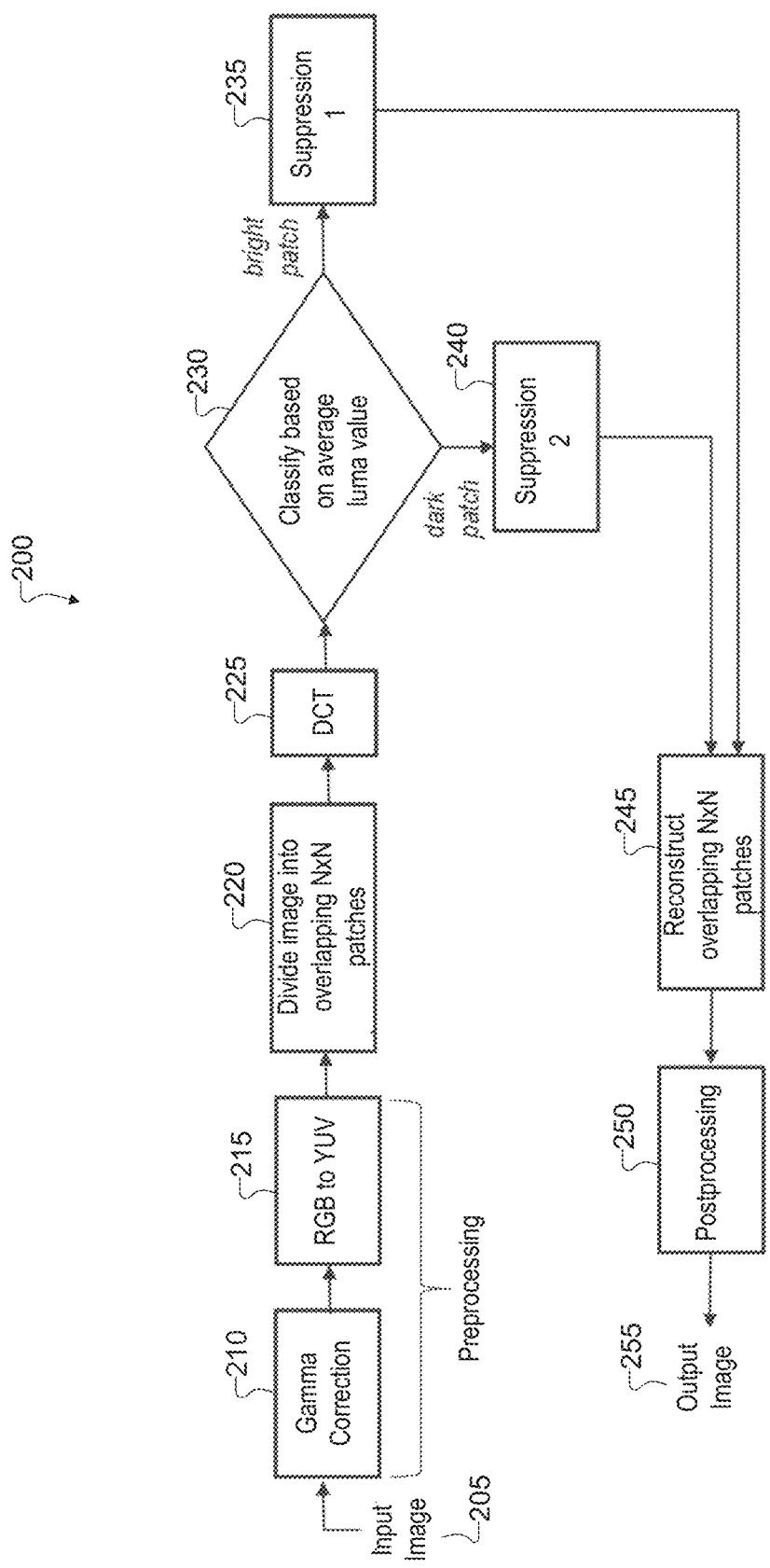
FIG. 2 illustrates an example process for adaptive discrete cosine transform (DCT) noise filtering for digital images according to this disclosure.

FIG. 2 illustrates an example process 200 for adaptive DCT noise filtering for digital images according to this disclosure. For ease of explanation, the process 200 is described as being implemented using one or more components of the electronic device 101 described above. However, this is merely one example, and the process 200 could be implemented using any other suitable device(s), such as the server 106.

As shown in FIG. 2, the electronic device 101 obtains a digital image 205 as an input to the process 200. Depending on the implementation, the image 205 could be captured by the electronic device 101 (such as by using at least one image sensor 180), retrieved from the memory 130, received from another electronic device (such as over the network 162), or obtained in any other suitable way. The electronic device 101 performs one or more preprocessing operations involving the image 205, such as a gamma correction operation 210 and an RGB-to-YUV conversion operation 215, to prepare the image 205 for other portions of the process 200. The gamma correction operation 210 is performed to convert linear image data of the image 205 into a non-linear space, such as a roughly logarithmic scale. The non-linear space can better simulate how the human visual system would perceive the image 205 when viewing the image 205. The gamma correction operation 210 also reveals additional details in darker (less bright) areas of the image 205. The gamma correction operation 210 can represent any suitable gamma correction technique.

Figure 3A:
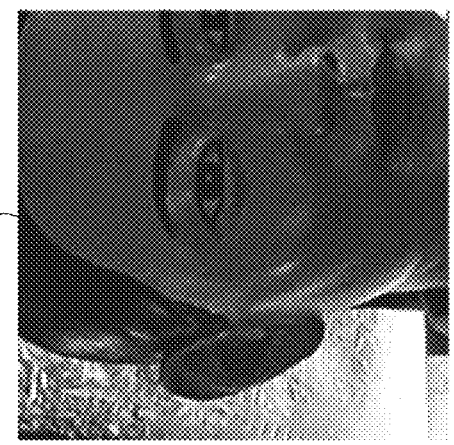
FIGS. 3A through 3D illustrate example details of an RGB-to-YUV conversion operation according to this disclosure.
Figure 3D:
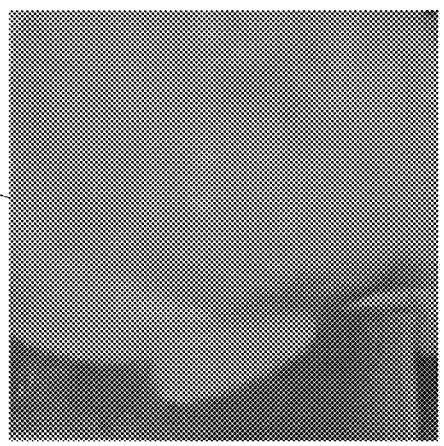
Figure 3C:
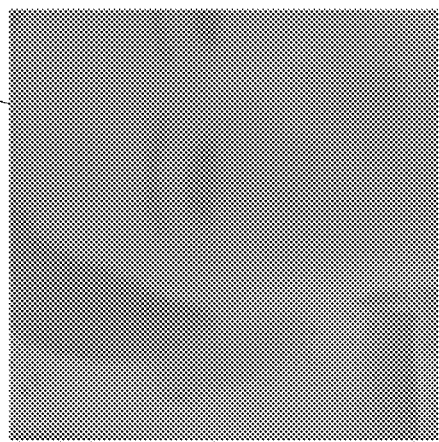
Figure 3B:

The RGB-to-YUV conversion operation 215 is performed to convert the (linear or non-linear) image data associated with the image 205 from a red-green-blue (RGB) domain to a luma-chroma (YUV) domain. Any suitable image conversion technique can be used for the RGB-to-YUV conversion operation 215. FIGS. 3A through 3D illustrate example details of the RGB-to-YUV conversion operation 215 according to this disclosure. In particular, FIG. 3A shows an image 301 in the RGB domain. The image 301 can represent the image 205 after the image 205 has been processed using the gamma correction operation 210. FIGS. 3B through 3D show results after the image 301 has been processed using the RGB-to-YUV conversion operation 215. In particular, the image 302 in FIG. 3B represents the luma (Y) channel of the image 301, the image 303 in FIG. 3C represents the chroma (U) channel of the image 301, and the image 304 in FIG. 3D represents another chroma (V) channel of the image 301. As can be seen from the images 302-304, most of the image content information of the image 301, such as brightness variation and edge content, is available in the luma (Y) channel. The chroma channels (U, V) mostly contain encoded color information and generally have limited information about edge and brightness. Therefore, in the process 200, the luma (Y) channel may be used to classify image patches and determine the amount of DCT filtering needed later.

Figure 4:
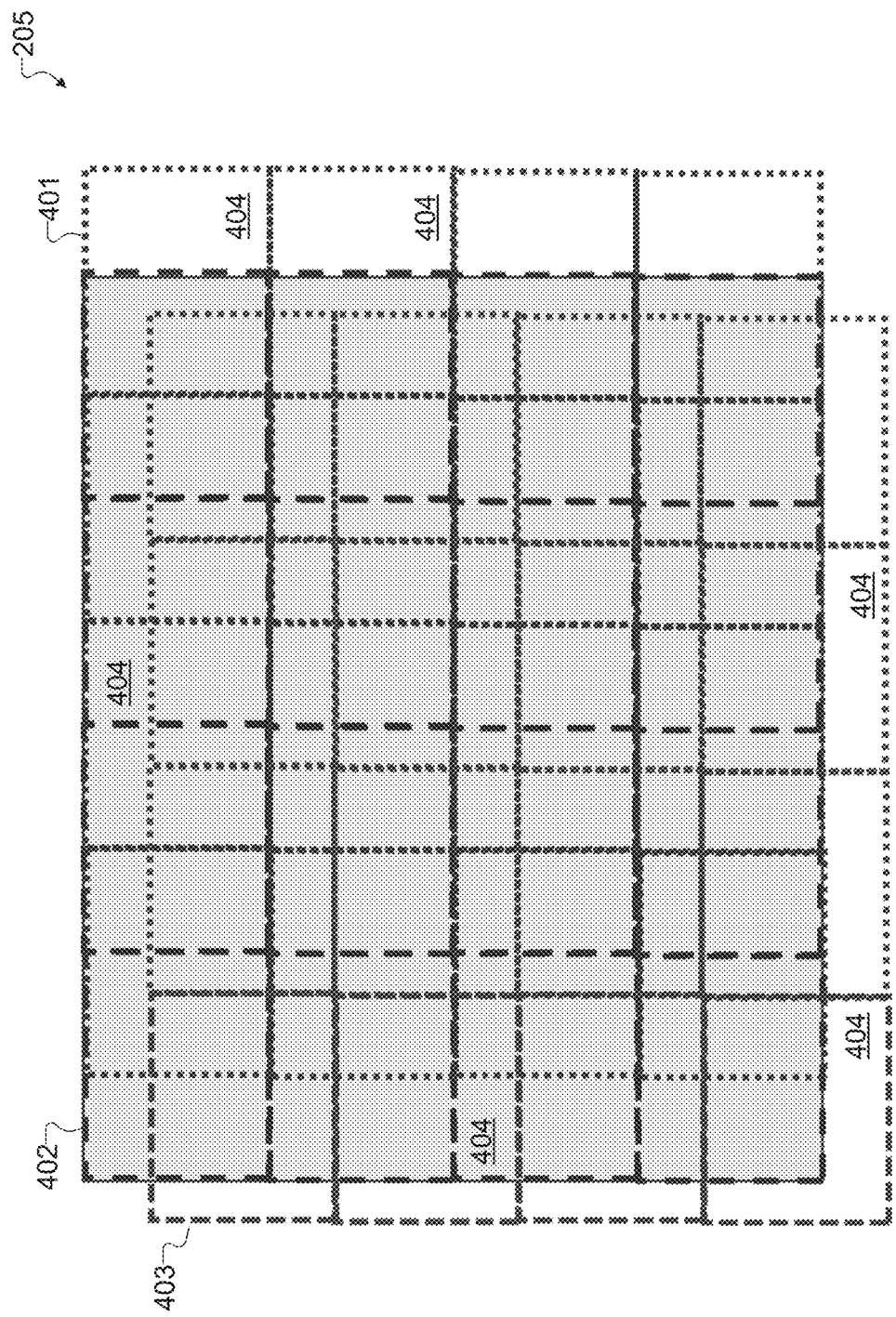
FIG. 4 illustrates an example image divided into multiple sets of image patches according to this disclosure.

After the image 205 has been converted to the YUV domain, the electronic device 101 performs an image division operation 220 to divide the image 205 into overlapping image patches. The image division operation 220 is performed so that the image 205 can be processed on a patch-by-patch basis for spatial localization. FIG. 4 shows an example image 205 divided into multiple sets of image patches according to this disclosure. As shown in FIG. 4, the image 205 has been divided into three sets 401-403 of image patches 404, although a larger number of sets of image patches can be selected. In this example, each set 401-403 includes sixteen image patches 404 arranged in a 4×4 grid configuration, although other numbers of sets and numbers of image patches may be used. The image patches 404 in one set 401-403 are together the same size as the image 205. Thus, if the image 205 is a 256 pixel by 256 pixel image, each image patch 404 may have a size of 64 pixels by 64 pixels. The size of each image patch 404 can be determined based on the size of the image 205 and can be predetermined.

Each set 401-403 is offset from other sets 401-403 such that the image patches 404 of different sets 401-403 may overlap. That is, one image patch 404 in the set 401 overlaps with an image patch 404 in at least one of the other sets 402-403. Some sets 401-403 may be offset in the X direction from another set 401-403, such as where the set 401 is offset from the set 402 in the X direction. Also, some sets 401-403 may be offset in the Y direction from another set 401-403. Further, some sets 401-403 may be offset in both the X and Y directions from another set 401-403, such as where the set 403 is offset from the sets 401 and 402 in both the X and Y directions. The size of the offset between sets 401-403 can be set in any suitable manner, such as when the size of the offset is predetermined based on the size of each image patch 404. As a particular example, the offset may be one-fourth of each dimension, so the offset could be 16 pixels if each image patch 404 is 64 pixels by 64 pixels.

Later, as discussed below, the sets 401-403 will be reconstructed separately, and areas that are common to multiple sets 401-403 can be averaged. Any suitable technique can be used for dividing the image 205 into multiple sets 401-403 of image patches 404. While FIG. 4 shows three overlapping sets 401-403, other numbers of sets are possible. Also, different numbers of image patches in each set and different sizes of image patches are possible. Further, in some embodiments, more than one grid configuration of the image patches 404 can be used to avoid resulting grid artifacts, which can occur when only one grid configuration is used. For example, the set 401 could include square image patches 404, while the set 402 could include rectangular image patches 404.

After the image 205 has been divided into image patches 404, the electronic device 101 performs a DCT operation 225 on each image patch 404 in each set 401-403. In the DCT operation 225, the electronic device 101 determines one or more DCT coefficients for each pixel of each image patch 404. Together, the DCT coefficients represent the DCT spectrum of the image patch 404, which in some embodiments can be visually represented as a power spectral density (PSD) grid having the same dimensions as the image patch 404. After the DCT coefficients are obtained, the electronic device 101 can use the DCT coefficients to obtain luma values and edge content information of each image patch 404. In some embodiments, the electronic device 101 performs the DCT operation 225 on the Y, U, and V channels of each image patch 404. However, the electronic device 101 can determine the luma values and edge content information based on the DCT coefficients of only the Y channel if desired or using the Y channel and one U or V channel, since the Y channel contains the largest amount of information of the brightness variation and edge content of the image 205.

Figure 5:
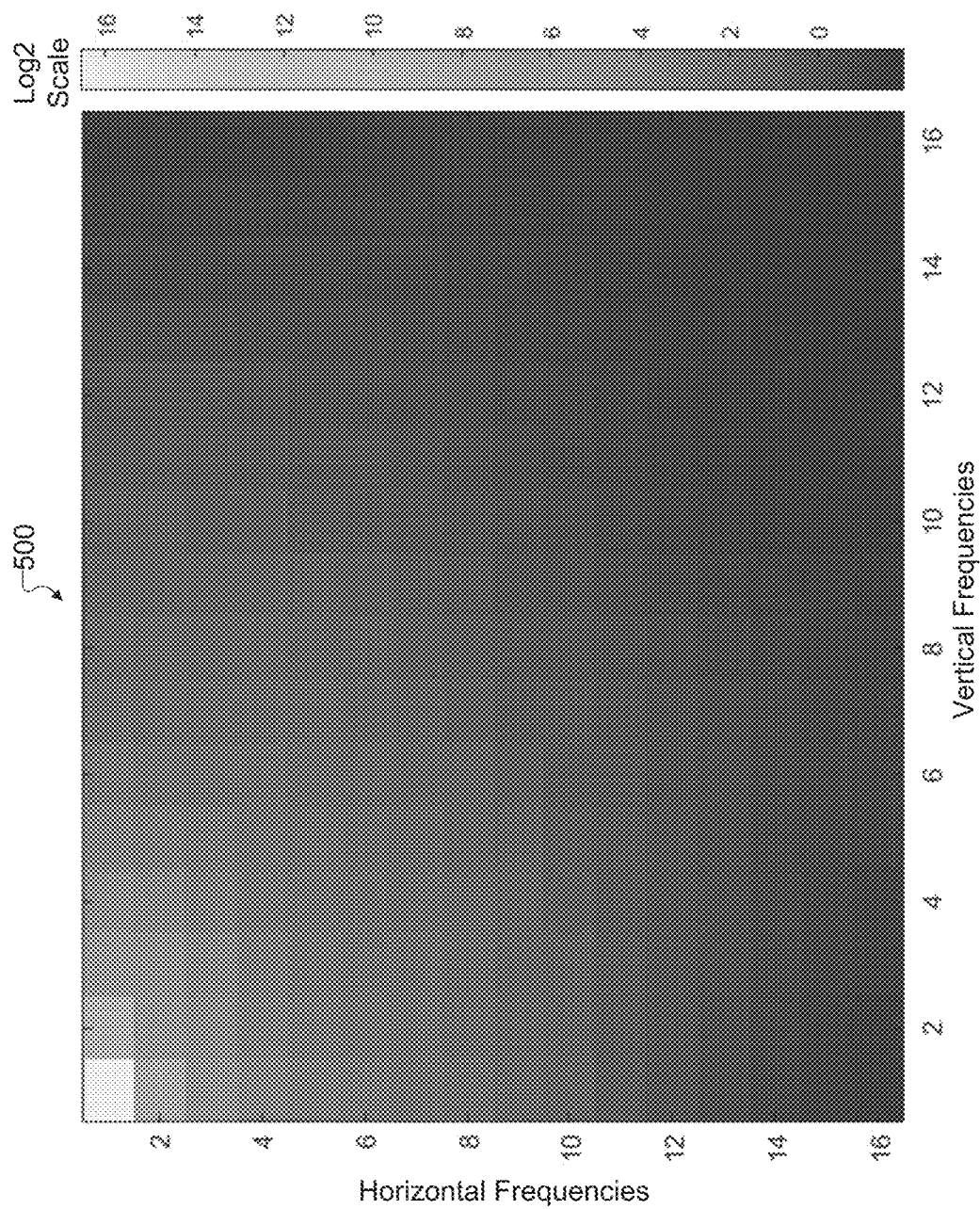
FIG. 5 illustrates an example depiction of a DCT spectrum of an image patch according to this disclosure.

FIG. 5 illustrates an example depiction of a DCT spectrum 500 of an image patch 404 according to this disclosure. As shown in FIG. 5, the image patch 404 is 16 pixels by 16 pixels, and the DCT spectrum 500 has 16 DCT coefficients in the X direction and 16 DCT coefficients in the Y direction. Together, the DCT spectrum is also on a 16 by 16 grid. In some embodiments, the DCT coefficients in the X direction represent vertical frequencies or harmonics, and the DCT coefficients in the Y direction represent horizontal frequencies or harmonics. Thus, if the image patch 404 has significant edge content in the vertical direction, the DCT coefficients in the X direction will reflect that edge content by having larger values. A number of DCT techniques are known, and the DCT operation 225 can include any suitable DCT technique that generates DCT coefficients from portions of images.

Using at least the luma values, the electronic device 101 performs a classification operation 230 to classify each image patch 404 into at least one class. For example, the electronic device 101 can classify each image patch 404 as a dark patch or a bright patch based on the determined luma values. In some embodiments, the electronic device 101 classifies each image patch 404 based on the average luma value of the image patch 404. For instance, if the average luma value of the image patch 404 is greater than a specified threshold value, the electronic device 101 may consider the image patch 404 to be a bright patch. Conversely, if the average luma value of the image patch 404 is less than the specified threshold value, the electronic device 101 may consider the image patch 404 be a dark patch.

After the image patches 404 have been classified, the electronic device 101 performs one of multiple noise suppression operations on the image patches 404. As shown in FIG. 2, if the image patch 404 is classified as a bright patch, the electronic device 101 performs a first noise suppression operation 235. If the image patch 404 is classified as a dark patch, the electronic device 101 performs a second noise suppression operation 240. In both noise suppression operations 235 and 240, the electronic device 101 filters each image patch 404 for noise suppression by suppressing one or more of the DCT coefficients of the image patch 404. The amount of noise suppression performed on the DCT coefficients depends on which noise suppression operation 235 or 240 is performed, which itself is determined based on whether the image patch 404 is classified as a bright patch or a dark patch.

Figure 6:
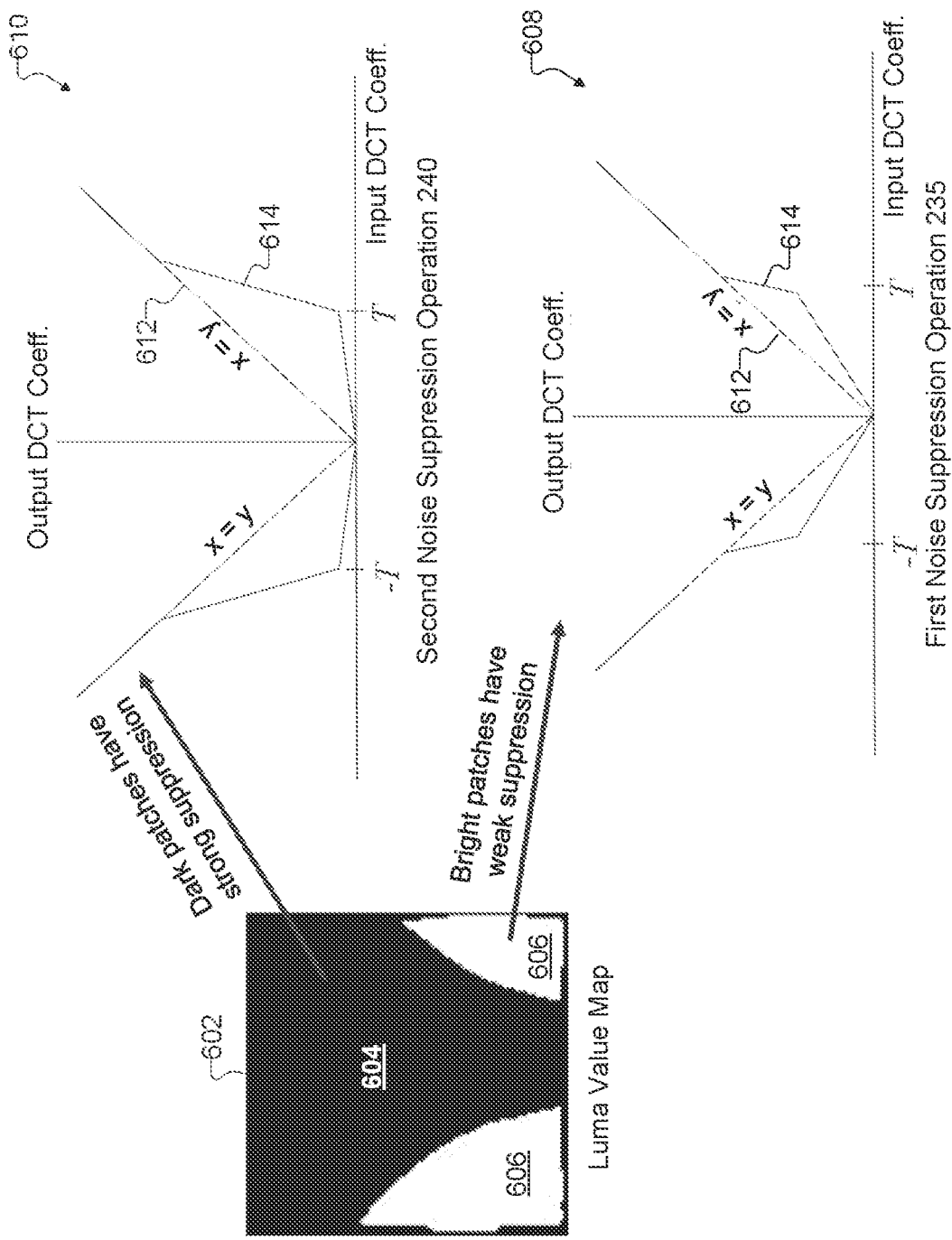
FIG. 6 illustrates an example of noise suppression operations that can be performed in the process of FIG. 2 according to this disclosure.

FIG. 6 illustrates an example of noise suppression operations 235 and 240 that can be performed in the process 200 of FIG. 2 according to this disclosure. As shown in FIG. 6, a luma value map 602 includes luma values for the image 205. The luma values in the luma value map 602 can be determined by the electronic device 101 during the DCT operation 225. As reflected in the luma values, it can be seen that the luma value map 602 includes one or more dark areas 604 and one or more bright areas 606. Each of the areas 604 and 606 includes one or more image patches 404, which have been classified as dark or bright. That is, the dark area(s) 604 can include dark image patches 404, and the bright area(s) 606 can include bright image patches 404.

The electronic device 101 performs either the noise suppression operation 235 or the noise suppression operation 240 on each image patch 404 by suppressing (such as reducing the value of) one or more of the DCT coefficients of the image patch 404. Charts 608 and 610 illustrate this concept. The X axis of each chart 608 and 610 represents an input value of each DCT coefficient before the noise suppression operations 235 and 240. The Y axis of each chart 608 and 610 represents the output value of each DCT coefficient after the noise suppression operations 235 and 240. A curve 612 is shown for comparison purposes and represents a theoretical "no noise suppression" line in which the output value equals the input value (such as x=y) for any value of a DCT coefficient. Curves 614 are actual suppression curves that illustrate how much each DCT coefficient is reduced in value based on its input value.

As shown in the charts 608 and 610, when the input value of a particular DCT coefficient is within a threshold range (such as when $-T \le$ input value $\le T$, where T is a specified threshold value), the electronic device 101 reduces the value of the DCT coefficient to a lower value. For DCT coefficient input values outside of the threshold range (such as when input value$<-T$ or input value$>T$), the electronic device 101 does not reduce the value of the DCT coefficient much or at all. The conversion of the DCT coefficients from input values to output values is represented by the curves 614. The threshold T shown in the charts 608 and 610 can be selected to effectively control the strength of denoising. In some embodiments, the value of the threshold T can be estimated based on the PSD of the gamma-corrected image 205.

As shown in the charts 608 and 610, the amount of noise suppression is greater in the second noise suppression operation 240 than in the first noise suppression operation 235, as indicated by the lower values of the curve 614 in the chart 610 versus the chart 608. This means that the DCT coefficients of the dark patches 404 are subject to stronger noise suppression (such as greater denoising) than the DCT coefficients of the bright patches 404, which are subject to relatively weaker noise suppression (such as less denoising).

Once the noise suppression has been performed on all of the image patches 404, the electronic device 101 performs a reconstruction operation 245 to reconstruct the image 205 on a patch-by-patch basis. In the reconstruction operation 245, the electronic device 101 performs one or more suitable algorithms or processes to convert the image 205 from a filtered frequency domain back to the spatial domain. The reconstruction operation 245 can include operations that are similar to those of the image division operation 220 but performed in reverse order. The electronic device 101 may also perform one or more post-processing operations 250 to convert the reconstructed image 205 to an output image 255. In some embodiments, the post-processing operations 250 can include optional steps such as increasing the color saturation or changing the overall brightness of the output image 255 to further hide dark area noise. Due to the adaptive noise filtering of the process 200, the output image 255 exhibits reduced read noise in its dark regions without compromising quality in its bright regions. Thus, for instance, edge content and texture content can be preserved in the bright regions. The output image 255 can be displayed for viewing by a user, saved in a memory, transmitted to another electronic device, or used in any other suitable operation.

Although FIGS. 2 through 6 illustrate one example of a process 200 for adaptive DCT noise filtering for digital images and related details, various changes may be made to FIGS. 2 through 6. For example, while shown as a specific sequence of operations, various operations shown in FIGS. 2 through 6 could overlap, occur in parallel, occur in a different order, or occur any number of times (including zero times). Also, the specific operations shown in FIGS. 2 through 6 are examples only, and other techniques could be used to perform each of the operations shown in FIGS. 2 through 6. For example, similar mathematical transform techniques can be used in place of DCT, such as DFT or FFT.

Figure 7:
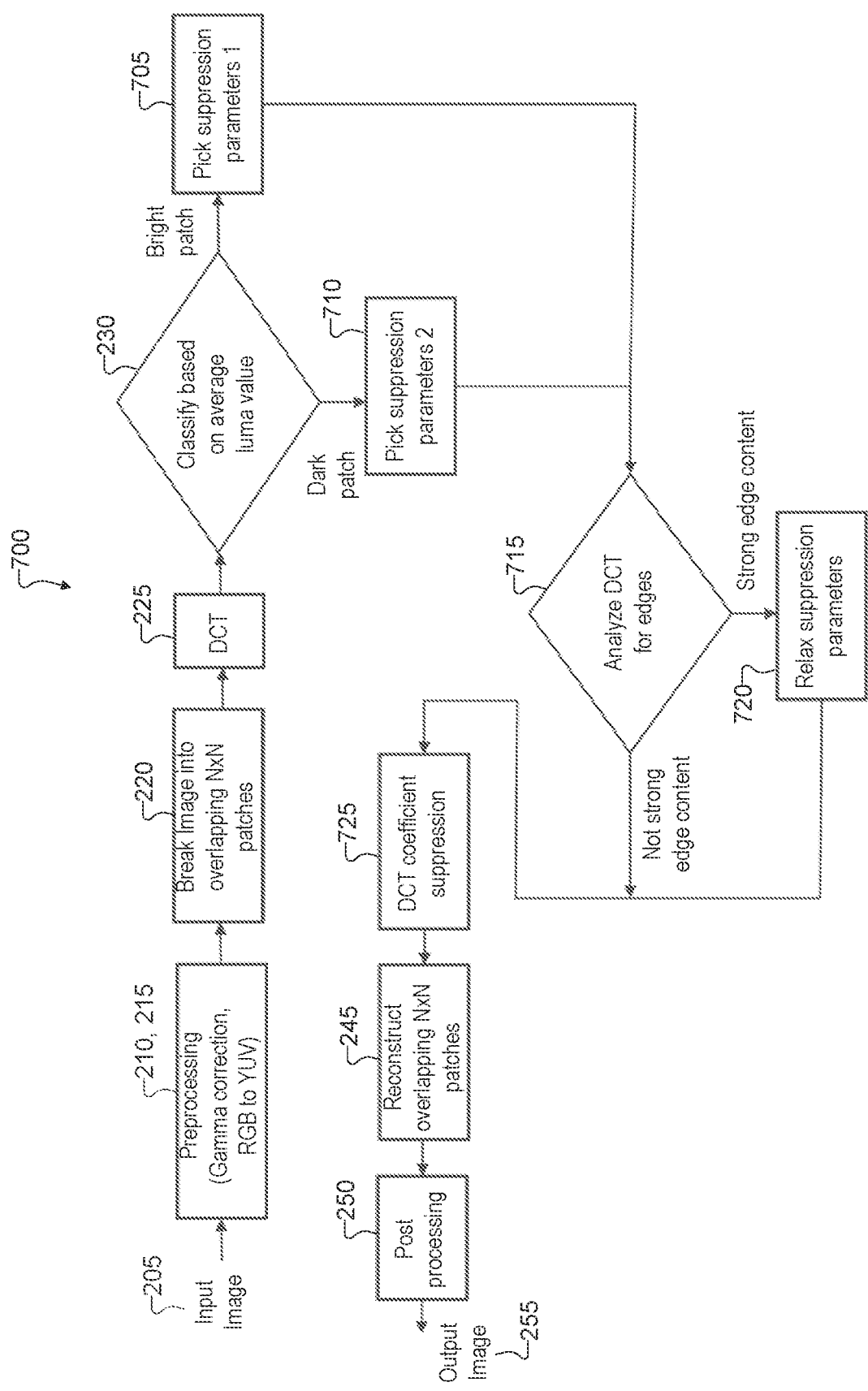
FIG. 7 illustrates another example process for adaptive DCT noise filtering for digital images according to this disclosure.

FIG. 7 illustrates another example process 700 for adaptive DCT noise filtering for digital images according to this disclosure. For ease of explanation, the process 700 is described as being implemented using one or more components of the electronic device 101 described above. However, this is merely one example, and the process 700 could be implemented using any other suitable device(s), such as the server 106.

As shown in FIG. 7, the process 700 includes multiple operations that are the same as or similar to corresponding operations of the process 200 of FIG. 2. In the process 700, the electronic device 101 obtains an input image 205, performs preprocessing operations on the image 205 (such as a gamma correction operation 210 and an RGB-to-YUV conversion operation 215), performs an image division operation 220 to divide the image 205 into overlapping image patches 404, performs a DCT operation 225 on each image patch 404, and performs a classification operation 230 to classify each image patch 404 as a dark patch or a bright patch.

After the image patches 404 have been classified, the electronic device 101 performs one of multiple parameter selection operations based on the image patches 404. As shown in FIG. 7, if an image patch 404 is classified as a bright patch, the electronic device 101 performs a first parameter selection operation 705. If the image patch 404 is classified as a dark patch, the electronic device 101 performs a second parameter selection operation 710. In contrast to the operations 235 and 240 in FIG. 2, in both parameter selection operations 705 and 710, the electronic device 101 merely selects initial suppression parameters based on whether the image patch 404 is a bright patch or a dark patch. The electronic device 101 does not actually perform any noise suppression in the operations 705 and 710. The selection of the initial suppression parameters can be the same as or similar to the electronic device 101 determining the curves 614 in the charts 608 and 610 of FIG. 6.

Once the initial suppression parameters are determined, the electronic device 101 performs an edge analysis operation 715 to determine edge content information of each image patch 404. The edge content information indicates the presence of edges or texture in the image patch 404. In some embodiments, the electronic device 101 does not perform a separate edge detection algorithm (such as a canny edge detector). Instead, the electronic device 101 relies on the already-computed DCT spectrum of the image patch 404 and looks for energy content along specific indices of the DCT spectrum. Note, however, that a separate edge detection algorithm may be used here.

Figures 8A, 8B:
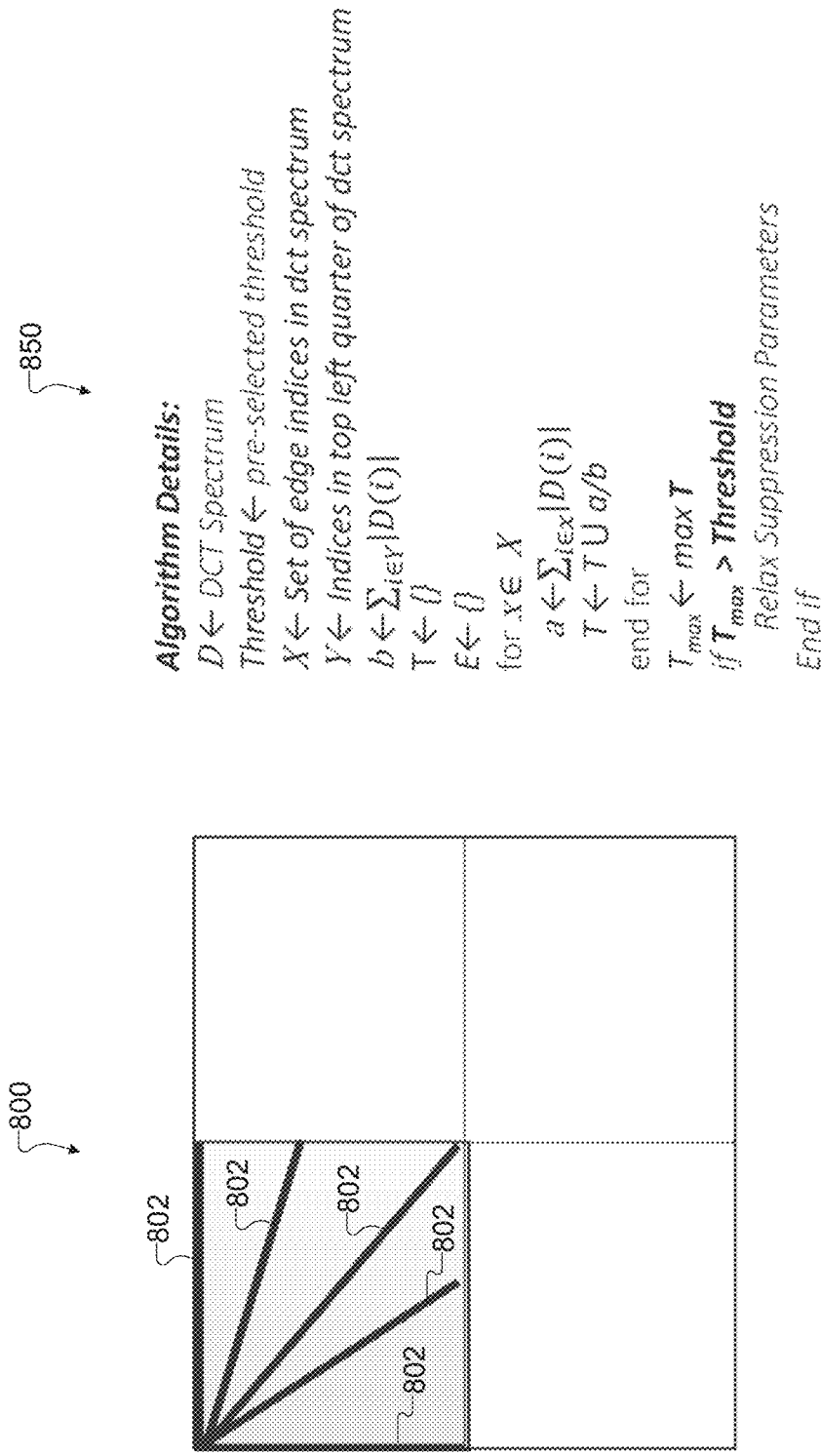
FIGS. 8A and 8B illustrate example details of an edge analysis operation that can be performed in the process of FIG. 7 according to this disclosure.

FIGS. 8A and 8B illustrate example details of an edge analysis operation 715 that can be performed in the process 700 of FIG. 7 according to this disclosure. In particular, FIG. 8A shows a DCT spectrum 800 of an image patch 404. The DCT spectrum 800 may be the same as or similar to the DCT spectrum 500 shown in FIG. 5, although the specific DCT spectrum will vary based on the image contents. In the edge analysis operation 715, the DCT spectrum 800 is divided into quarters, and only the top left quarter is analyzed to reduce computational complexity. However, the entire DCT spectrum can be analyzed to detect edges. The electronic device 101 selects multiple indices 802 in multiple radial directions in the top left quarter to determine the edge content. The electronic device 101 computes the normalized energy content along each of the indices 802 in the image patch 404. If the normalized energy content is more than a specified threshold, the electronic device 101 classifies the image patch 404 as containing strong edge content. If the normalized energy content is less than the specified threshold, the electronic device 101 classifies the image patch 404 as not containing strong edge content. FIG. 8B shows an example algorithm 850 of the edge analysis operation 715. Of course, other algorithms for performing the edge analysis operation 715 are possible, such as machine learning-based algorithms.

If the image patch 404 includes strong edge content (such as a significant presence of edges or texture), it may be desired to denoise less aggressively in order to retain the strong edge content details in the image 205. Accordingly, in a relaxation operation 720, the electronic device 101 relaxes the initial suppression parameters determined in the operations 705 and 710. Here, relaxing the initial suppression parameters refers to changing the suppression parameters such that less noise suppression will be performed on the image patch 404.

Figure 9:
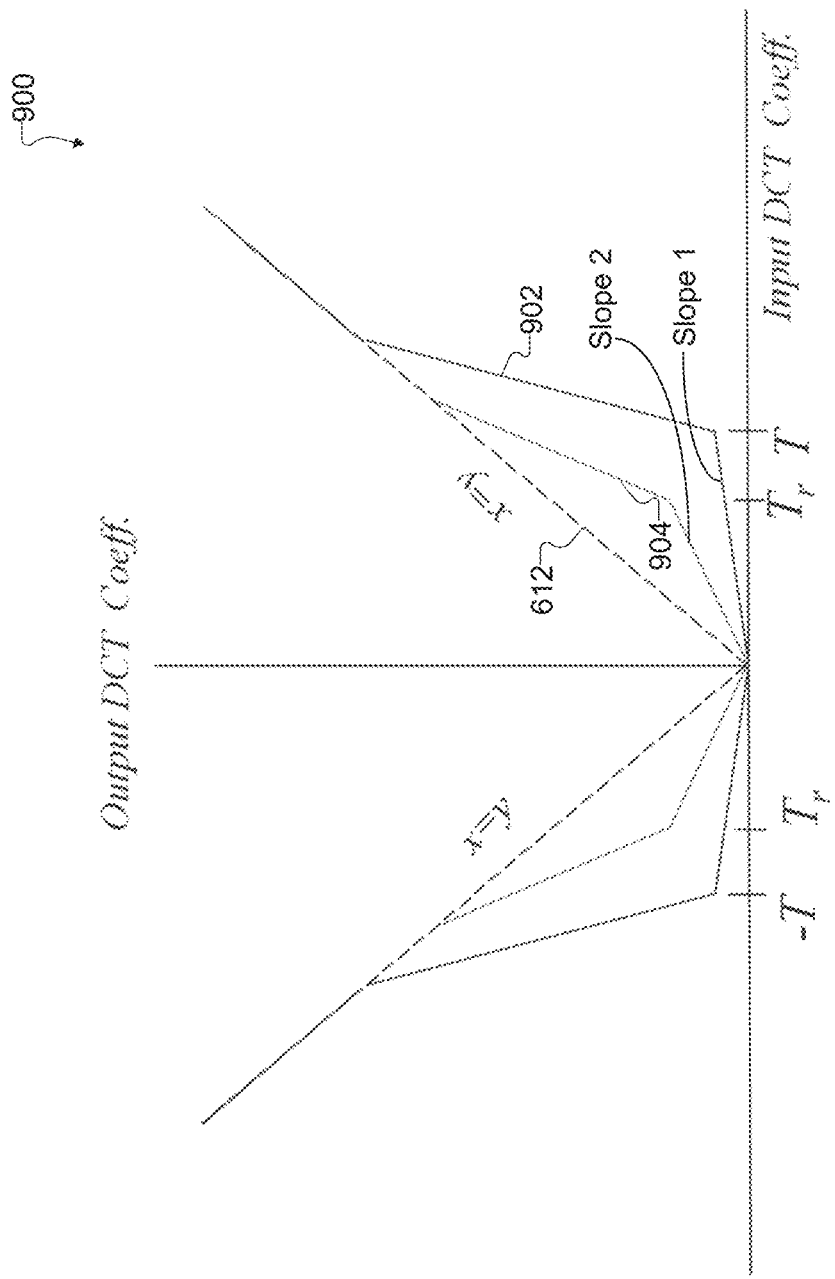
FIG. 9 illustrates an example chart showing details of a relaxation operation that can be performed in the process of FIG. 7 according to this disclosure.

FIG. 9 illustrates an example chart 900 showing details of a relaxation operation 720 that can be performed in the process 700 of FIG. 7 according to this disclosure. As shown in FIG. 9, the chart 900 shows multiple curves 902 and 904 for a noise suppression operation. The chart 900 is similar to the charts 608 and 610 in FIG. 6 and includes a theoretical "no noise suppression" curve 612 for comparison purposes. The curve 902 can represent noise suppression that would be performed using the initial suppression parameters determined in the parameter selection operations 705 and 710. However, relaxation of the initial suppression parameters means transforming the curve 902 to be closer to the "no noise suppression" curve 612. In some cases, this can be achieved by reducing the threshold T, increasing the slope of the curve 902 ("Slope 1"), or both. In the chart 900, the curve 902 has been relaxed to become the curve 904 by reducing the threshold T to $T_r$ (such as $T_r=0.8*T$) and increasing slope 1 to slope 2 (such as Slope 2=1.2*Slope 1). Of course, the degree to which the slopes are increased or the threshold is reduced is a design choice and is not restricted to the numbers shown above as examples.

Returning to FIG. 7, if the electronic device 101 determines that the image patch 404 does not include strong edge content in the edge analysis operation 715, operation 720 is not performed. In that case, the initial suppression parameters selected in the parameter selection operations 705 and 710 are retained.

At operation 725, the electronic device 101 performs noise suppression by suppressing one or more DCT coefficients of each image patch 404 using the initial suppression parameters selected in the parameter selection operations 705 and 710 or the relaxed suppression parameters determined in the relaxation operation 720. The noise suppression in operation 725 can be the same as or similar to the noise suppression described in the noise suppression operations 235 and 240 of FIG. 2. In this case, though, the noise suppression of the image patch 404 is based on both (i) the luma values as determined in the operations 235 and 240 and (ii) the edge content of the image patch 404 as determined in the edge analysis operation 715.

Once the noise suppression has been performed on all of the image patches 404, the electronic device 101 performs a reconstruction operation 245 to reconstruct the image 205 on a patch-by-patch basis. The electronic device 101 can also perform one or more post-processing operations 250 to convert the image 205 to an output image 255. Due to the adaptive noise filtering of the process 700, the output image 255 exhibits reduced read noise in its dark regions without comprising quality in its bright regions. That is, edge content and texture content are preserved in the bright regions. The output image 255 can be displayed for viewing by a user, saved in a memory, transmitted to another electronic device, or used in any other suitable operation.

Although FIGS. 7 through 9 illustrate another example of a process 700 for adaptive DCT noise filtering for digital images and related details, various changes may be made to FIGS. 7 through 9. For example, while shown as a specific sequence of operations, various operations shown in FIGS. 7 through 9 could overlap, occur in parallel, occur in a different order, or occur any number of times (including zero times). Also, the specific operations shown in FIGS. 7 through 9 are examples only, and other techniques could be used to perform each of the operations shown in FIGS. 7 through 9. For example, similar mathematical transform techniques can be used in place of DCT, such as DFT or FFT.

Figure 10:
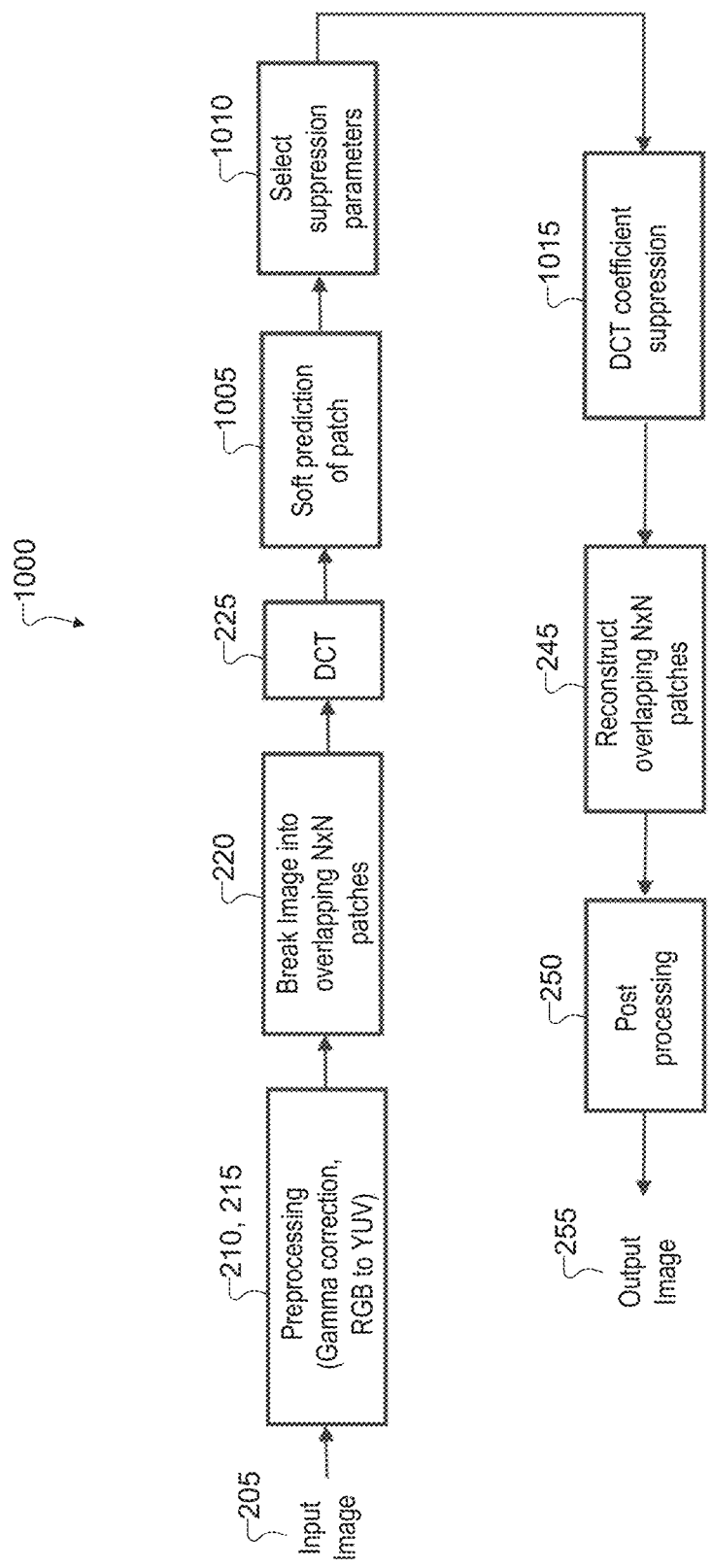
FIG. 10 illustrates yet another example process for adaptive DCT noise filtering for digital images according to this disclosure.

FIG. 10 illustrates yet another example process 1000 for adaptive DCT noise filtering for digital images according to this disclosure. For ease of explanation, the process 1000 is described as being implemented using one or more components of the electronic device 101 described above. However, this is merely one example, and the process 1000 could be implemented using any other suitable device(s), such as the server 106.

As shown in FIG. 10, the process 1000 includes multiple operations that are the same as or similar to corresponding operations of the process 200 of FIG. 2. In the process 1000, the electronic device 101 obtains an input image 205, performs preprocessing operations on the image 205 (such as a gamma correction operation 210 and an RGB-to-YUV conversion operation 215), performs an image division operation 220 to divide the image 205 into overlapping image patches 404, and performs a DCT operation 225 on each image patch 404.

After the DCT operation has been performed on each of the image patches 404, the electronic device 101 performs a prediction operation 1005 to predict at least one classification of each image patch 404. Instead of using a hard classification technique to classify a patch as bright or dark or as having strong edge content or not, the prediction operation 1005 could use a trained machine learning model to perform a soft prediction of the classification. In some embodiments, the machine learning model is a deep learning network or other machine learning model that can be trained to learn different features of an image patch based on multiple training data patches, such as training data patches with and without edges. Once trained, the deep learning network can generate a soft prediction of each image patch 404. For instance, the deep learning network can predict the probability of an image patch 404 containing edge content or not. In some embodiments, the electronic device 101 can assign a prediction value between zero and one to each image patch 404 based on the prediction. A prediction value of zero can represent low or zero probability of edge content, while a prediction value of one can represent high probability or certainty of edge content. Such prediction values can be used to weigh suppression parameters for DCT coefficient suppression. Of course, other ranges of values and other representations from values are possible and within the scope of this disclosure. Also, the machine learning model can include other types of machine learning models besides deep learning models, since any suitable machine learning model can be used.

After the classification of each image patch 404 is predicted, the electronic device 101 selects suppression parameters for DCT coefficient suppression in a parameter selection operation 1010. The parameter selection operation 1010 can be similar to the parameter selection operations 705 and 710 of FIG. 7. However, in the parameter selection operation 1010, the parameters can be linearly weighed based on the prediction values for the image patches 404 (although other weightings are also possible). At operation 1015, the electronic device 101 performs noise suppression by suppressing one or more DCT coefficients of each image patch 404 using the suppression parameters selected in the parameter selection operation 1010. The noise suppression in operation 1015 can be the same as or similar to the noise suppression described in the noise suppression operations 235 and 240 of FIG. 2. In this case, though, the noise suppression of the image patch 404 is based on the soft prediction of the image patch 404 determined in the prediction operation 1005.

Once the noise suppression has been performed on all of the image patches 404, the electronic device 101 performs a reconstruction operation 245 to reconstruct the image 205 on a patch-by-patch basis. The electronic device 101 can also perform one or more post-processing operations 250 to convert the image 205 to an output image 255. The output image 255 can be displayed for viewing by a user, saved in a memory, transmitted to another electronic device, or used in any other suitable operation.

Although FIG. 10 illustrates yet another example of a process 1000 for adaptive DCT noise filtering for digital images, various changes may be made to FIG. 10. For example, while shown as a specific sequence of operations, various operations shown in FIG. 10 could overlap, occur in parallel, occur in a different order, or occur any number of times (including zero times). Also, the specific operations shown in FIG. 10 are examples only, and other techniques could be used to perform each of the operations shown in FIG. 10. For example, similar mathematical transform techniques can be used in place of DCT, such as DFT or FFT.

Figure 11:
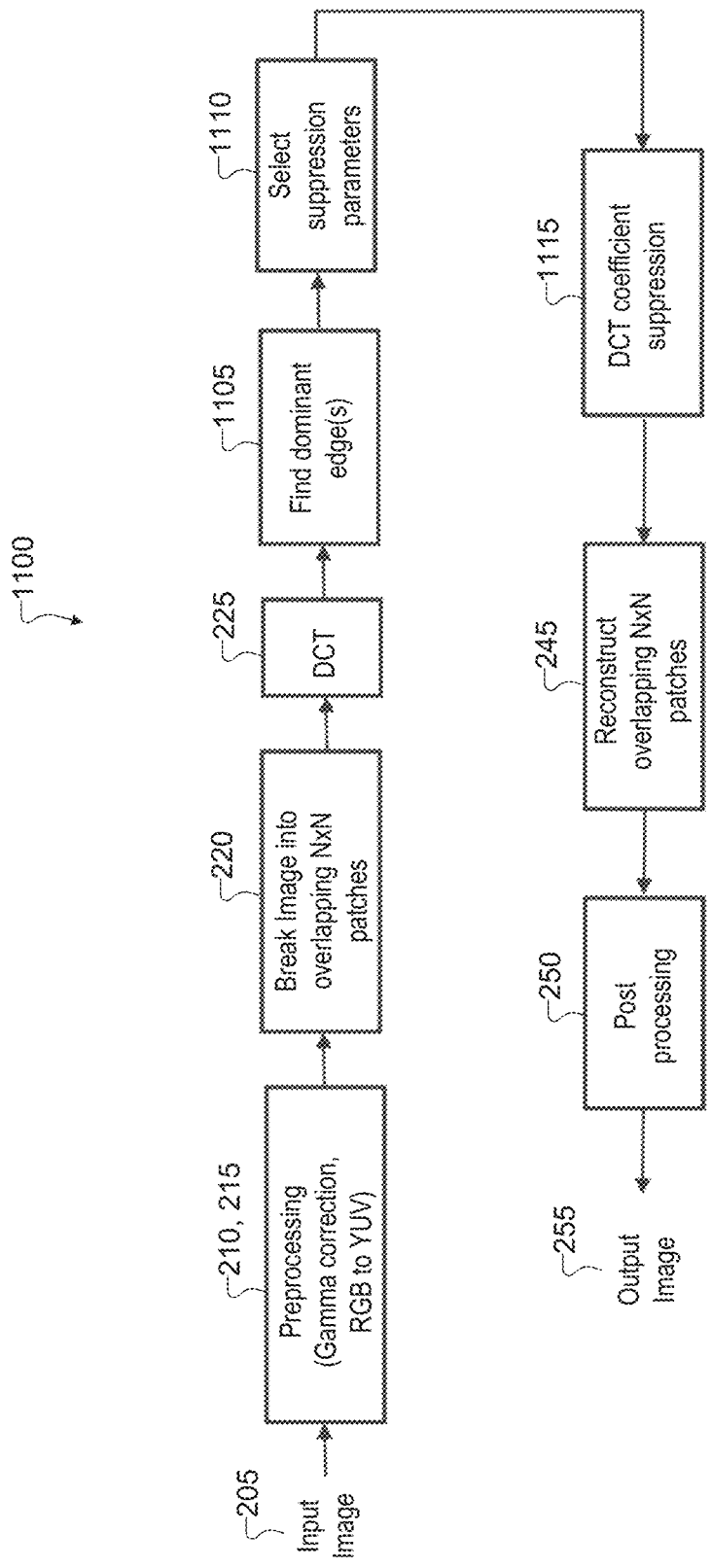
FIG. 11 illustrates still another example process for adaptive DCT noise filtering for digital images according to this disclosure.

FIG. 11 illustrates still another example process 1100 for adaptive DCT noise filtering for digital images according to this disclosure. For ease of explanation, the process 1100 is described as being implemented using one or more components of the electronic device 101 described above. However, this is merely one example, and the process 1100 could be implemented using any other suitable device(s), such as the server 106.

As shown in FIG. 11, the process 1100 includes multiple operations that are the same as or similar to corresponding operations of the process 200 of FIG. 2. In the process 1100, the electronic device 101 obtains an input image 205, performs preprocessing operations on the image 205 (such as a gamma correction operation 210 and an RGB-to-YUV conversion operation 215), performs an image division operation 220 to divide the image 205 into overlapping image patches 404, and performs a DCT operation 225 on each image patch 404.

After the DCT operation has been performed on each of the image patches 404, the electronic device 101 performs operation 1105 to determine the existence of one or more dominant edges in each image patch 404. In the process 1100, the electronic device 101 may only look at dominant edges in the image patch 404 to decide whether to perform strong noise suppression or weak noise suppression. As a result, sharp edges in the input image 205 can be retained by not choosing strong suppression of the DCT coefficients corresponding to the strong edges. In the operation 1105, the electronic device 101 examines energy content in the DCT spectrum of the image patch 404 to detect dominant edges in the image patch 404. In general, the presence of one or more dominant edges indicates that weaker suppression should be applied to the DCT coefficients corresponding to the edges of that image patch 404. FIG. 12 shows an example algorithm 1200 that can be performed in the process 1100 of FIG. 11 according to this disclosure. More specifically, the algorithm 1200 may be performed as at least part of the operation 1105. Of course, this is merely one example, and the operation 1105 can be performed using any suitable algorithm.

After the dominant edges of each image patch 404 are identified, the electronic device 101 selects suppression parameters for DCT coefficient suppression in a parameter selection operation 1110. The parameter selection operation 1110 can be similar to the parameter selection operations 705 and 710 of FIG. 7. However, in the parameter selection operation 1110, the parameters can be selected for strong noise suppression or weak noise suppression of the image patches 404 based on the presence of dominant edges in the image patches 404. In particular, the suppression parameters can be relaxed similar to FIG. 9 on the DCT coefficients that correspond to the edge content of the patch. At operation 1115, the electronic device 101 performs noise suppression by suppressing one or more DCT coefficients of each image patch 404 using the suppression parameters selected in the parameter selection operation 1110. The noise suppression in operation 1115 can be the same as or similar to the noise suppression described in the noise suppression operations 235 and 240 of FIG. 2. In this case, though, one or more DCT coefficients of the image patch 404 are suppressed while preserving one or more other spectral coefficients relevant to the dominant edges identified in the operation 1105.

Once the noise suppression has been performed on all of the image patches 404, the electronic device 101 performs a reconstruction operation 245 to reconstruct the image 205 on a patch-by-patch basis. The electronic device 101 can also perform one or more post-processing operations 250 to convert the image 205 to an output image 255. The output image 255 can be displayed for viewing by a user, saved in a memory, transmitted to another electronic device, or used in any other suitable operation.

Although FIGS. 11 and 12 illustrate still another example of a process 1100 for adaptive DCT noise filtering for digital images and related details, various changes may be made to FIGS. 11 and 12. For example, while shown as a specific sequence of operations, various operations shown in FIGS. 11 and 12 could overlap, occur in parallel, occur in a different order, or occur any number of times (including zero times). Also, the specific operations shown in FIGS. 11 and 12 are examples only, and other techniques could be used to perform each of the operations shown in FIGS. 11 and 12. For example, similar mathematical transform techniques can be used in place of DCT, such as DFT or FFT.

Note that the operations and functions shown in or described with respect to FIGS. 2 through 12 can be implemented in an electronic device 101, server 106, or other device in any suitable manner. For example, in some embodiments, the operations and functions shown in or described with respect to FIGS. 2 through 12 can be implemented or supported using one or more software applications or other software instructions that are executed by the processor 120 of the electronic device 101, server 106, or other device. In other embodiments, at least some of the operations and functions shown in or described with respect to FIGS. 2 through 12 can be implemented or supported using dedicated hardware components. In general, the operations and functions shown in or described with respect to FIGS. 2 through 12 can be performed using any suitable hardware or any suitable combination of hardware and software/firmware instructions.

Figure 13:
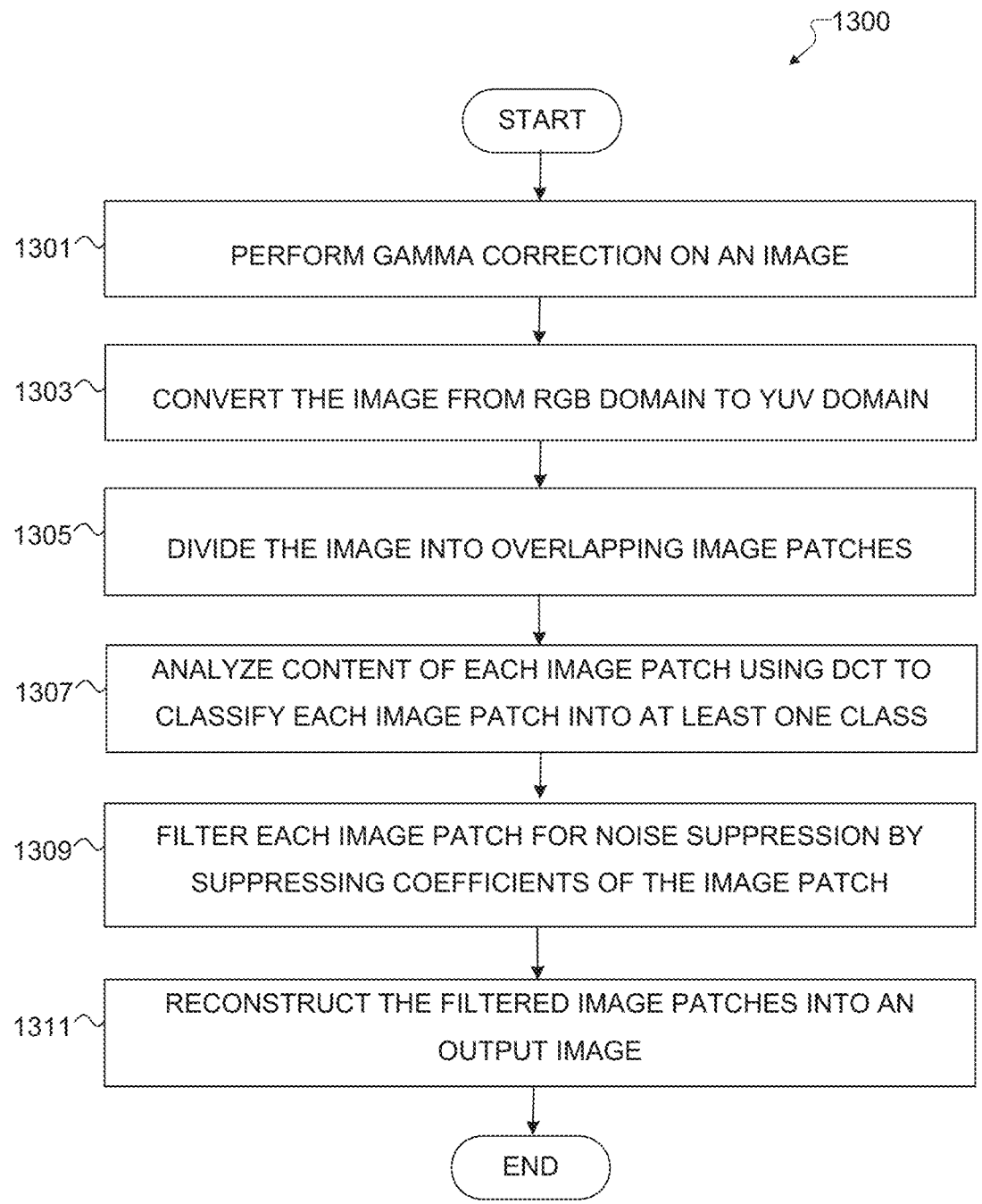
FIG. 13 illustrates an example method for adaptive noise filtering for digital images according to this disclosure.

FIG. 13 illustrates an example method 1300 for adaptive noise filtering for digital images according to this disclosure. For ease of explanation, the method 1300 shown in FIG. 13 is described as involving the use of the electronic device 101 shown in FIG. 1 and one or more of the processes 200, 700, 1000, and 1100 shown in FIGS. 2, 7, 10, and 11. However, the method 1300 shown in FIG. 13 could be used with any other suitable electronic device in any other suitable system and with any other suitable process.

As shown in FIG. 13, a gamma correction is performed on an image at step 1301. This could include, for example, the electronic device 101 performing the gamma correction operation 210 on the image 205. The image is converted from the RGB domain to the YUV domain at step 1303. This could include, for example, the electronic device 101 performing the RGB-to-YUV conversion operation 215 to convert the image 205 from the RGB domain to the YUV domain.

The image is divided into overlapping image patches at step 1305. This could include, for example, the electronic device 101 performing the image division operation 220 to divide the image 205 into overlapping image patches 404. Each patch has a specified size. Each image patch is analyzed using a mathematical transform technique at step 1307 to classify each image patch into at least one class. This could include, for example, the electronic device 101 performing the DCT operation 225 and the classification operation 230 to classify each image patch 404 as a dark patch or a bright patch.

Each image patch is filtered for noise suppression by suppressing one or more transform coefficients of the image patch at step 1309. This could include, for example, the electronic device 101 performing one of the noise suppression operations 235 or 240 to filter each image patch 404. An amount of suppression for each of the one or more transform coefficients is selected according to the at least one class of the image patch. The filtered image patches are reconstructed into an output image at step 1311. This could include, for example, the electronic device 101 reconstructing the filtered image patches 404 into the output image 255.

Although FIG. 13 illustrates one example of a method 1300 for adaptive noise filtering for digital images, various changes may be made to FIG. 13. For example, while shown as a series of steps, various steps in FIG. 13 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   dividing an image into overlapping image patches each having a specified size;
   analyzing content of each image patch using a mathematical transform technique to classify each image patch into at least one class, wherein the at least one class includes at least one of: a dark patch, a bright patch, or a patch having strong edge content;
   filtering each image patch for noise suppression by suppressing one or more transform coefficients of the image patch, wherein an amount of suppression for each of the one or more transform coefficients is selected according to the at least one class of the image patch such that (i) the amount of suppression for image patches classified as dark patches is increased and (ii) the amount of suppression for image patches classified as having strong edge content is reduced; and
   reconstructing the filtered image patches into an output image.

2. The method of claim 1, further comprising:
   before dividing the image into the overlapping image patches:
      performing a gamma correction on the image; and
      converting the image from a red-green-blue (RGB) domain to a luma-chroma (YUV) domain.

3. The method of claim 2, wherein analyzing the content of each image patch comprises:
   determining multiple transform coefficients of the image patch, the multiple transform coefficients comprising the one or more suppressed transform coefficients;
   determining multiple luma values of the image patch based on the multiple transform coefficients of the image patch; and
   classifying the image patch as a dark patch or a bright patch based on the determined luma values.

4. The method of claim 3, wherein analyzing the content of each image patch further comprises:
   determining edge content of the image patch based on the multiple transform coefficients of the image patch; and
   classifying the image patch as a patch with strong edge content or a patch without strong edge content based on the determined edge content.

5. The method of claim 4, wherein filtering each image patch comprises:
   filtering the image patch based on the determined luma values and the determined edge content of the image patch.

6. The method of claim 2, wherein analyzing the content of each image patch comprises:
   using a trained machine learning model to predict the at least one class for the image patch.

7. The method of claim 1, wherein filtering each image patch comprises:
   determining one or more dominant edges in the image patch; and
   wherein the one or more transform coefficients of the image patch are suppressed while preserving one or more other spectral coefficients relevant to the one or more dominant edges.

8. An electronic device comprising:
   at least one processor configured to:
      divide an image into overlapping image patches each having a specified size;
      analyze content of each image patch using a mathematical transform technique to classify each image patch into at least one class, wherein the at least one class includes at least one of: a dark patch, a bright patch, or a patch having strong edge content;
      filter each image patch for noise suppression by suppressing one or more transform coefficients of the image patch, wherein an amount of suppression for each of the one or more transform coefficients is selected according to the at least one class of the image patch such that (i) the amount of suppression for image patches classified as dark patches is increased and (ii) the amount of suppression for image patches classified as having strong edge content is reduced; and
      reconstruct the filtered image patches into an output image.

9. The electronic device of claim 8, wherein the at least one processor is further configured, before dividing the image into the overlapping image patches, to:
   perform a gamma correction on the image; and
   convert the image from a red-green-blue (RGB) domain to a luma-chroma (YUV) domain.

10. The electronic device of claim 9, wherein, to analyze the content of each image patch, the at least one processor is configured to:
    determine multiple transform coefficients of the image patch, the multiple transform coefficients comprising the one or more suppressed transform coefficients;
    determine multiple luma values of the image patch based on the multiple transform coefficients of the image patch; and
    classify the image patch as a dark patch or a bright patch based on the determined luma values.

11. The electronic device of claim 10, wherein, to analyze the content of each image patch, the at least one processor is further configured to:
    determine edge content of the image patch based on the multiple transform coefficients of the image patch; and
    classify the image patch as a patch with strong edge content or a patch without strong edge content based on the determined edge content.

12. The electronic device of claim 11, wherein, to filter each image patch, the at least one processor is configured to filter the image patch based on the determined luma values and the determined edge content of the image patch.

13. The electronic device of claim 9, wherein, to analyze the content of each image patch, the at least one processor is configured to use a trained machine learning model to predict the at least one class for the image patch.

14. The electronic device of claim 8, wherein:
    to filter each image patch, the at least one processor is configured to determine one or more dominant edges in the image patch; and
    the one or more transform coefficients of the image patch are suppressed while preserving one or more other spectral coefficients relevant to the one or more dominant edges.

15. A non-transitory machine-readable medium containing instructions that when executed cause at least one processor of an electronic device to:
    divide an image into overlapping image patches each having a specified size;
    analyze content of each image patch using a mathematical transform technique to classify each image patch into at least one class, wherein the at least one class includes at least one of: a dark patch, a bright patch, or a patch having strong edge content;

filter each image patch for noise suppression by suppressing one or more transform coefficients of the image patch, wherein an amount of suppression for each of the one or more transform coefficients is selected according to the at least one class of the image patch such that (i) the amount of suppression for image patches classified as dark patches is increased and (ii) the amount of suppression for image patches classified as having strong edge content is reduced; and reconstruct the filtered image patches into an output image.

16. The non-transitory machine-readable medium of claim 15, wherein the instructions when executed further cause the at least one processor, before dividing the image into the overlapping image patches, to:

perform a gamma correction on the image; and convert the image from a red-green-blue (RGB) domain to a luma-chroma (YUV) domain.

17. The non-transitory machine-readable medium of claim 16, wherein the instructions that when executed cause the at least one processor to analyze the content of each image patch comprise instructions that when executed cause the at least one processor to:

determine multiple transform coefficients of the image patch, the multiple transform coefficients comprising the one or more suppressed transform coefficients;

determine multiple luma values of the image patch based on the multiple transform coefficients of the image patch; and classify the image patch as a dark patch or a bright patch based on the determined luma values.

18. The non-transitory machine-readable medium of claim 17, wherein the instructions that when executed cause the at least one processor to analyze the content of each image patch further comprise instructions that when executed cause the at least one processor to:

determine edge content of the image patch based on the multiple transform coefficients of the image patch; and classify the image patch as a patch with strong edge content or a patch without strong edge content based on the determined edge content.

19. The non-transitory machine-readable medium of claim 18, wherein the instructions that when executed cause the at least one processor to filter each image patch comprise instructions that when executed cause the at least one processor to filter the image patch based on the determined luma values and the determined edge content of the image patch.

20. The non-transitory machine-readable medium of claim 16, wherein the instructions that when executed cause the at least one processor to analyze the content of each image patch comprise instructions that when executed cause the at least one processor to use a trained machine learning model to predict the at least one class for the image patch.

21. The non-transitory machine-readable medium of claim 15, wherein:

the instructions that when executed cause the at least one processor to filter each image patch comprise instructions that when executed cause the at least one processor to determine one or more dominant edges in the image patch; and the one or more transform coefficients of the image patch are suppressed while preserving one or more other spectral coefficients relevant to the one or more dominant edges.

\* \* \* \* \*